Aug. 1, 1944.  R. S. DRUMMOND  2,354,670

GEAR FINISHING

Filed Oct. 23, 1939

INVENTOR.
ROBERT S. DRUMMOND
BY Whittemore, Hulbert
& Belknap
ATTORNEYS

Patented Aug. 1, 1944

2,354,670

UNITED STATES PATENT OFFICE 2,354,670

GEAR FINISHING

Robert S. Drummond, Detroit, Mich.

Application October 23, 1939, Serial No. 300,881

2 Claims. (Cl. 90—1.6)

The present invention relates to gear finishing and more particularly to the final finishing of involute gears by rotating them in mesh with a gear finishing tool in the form of a gear conjugate to the gear to be finished, and having teeth provided with cutting edges.

In this type of gear finishing the tool and gear to be finished are placed in mesh with their axes crossed by a limited amount. One of the parts, either the gear or the tool, is positively rotated and the other part is mounted for free rotation and is rotated only by the intermeshing engagement between the teeth of the gear and tool. A feeding motion is introduced between the two parts in a plane parallel to the axis of both the gear and the tool.

In this type of gear finishing, as will be evident from the foregoing, the guiding action which determines the character of the tooth surfaces of the gear results from the contact between the teeth of the gear and the tool. Accordingly, it is absolutely essential in this type of finishing that the tooth contact be of a character which will produce the desired involute on the teeth of the gear being finished. For example, if the teeth of the cutter are of a length which produces a cramping action (or serious unequal unit pressure), it will be obvious that errors will be introduced into the tooth surfaces of the gear.

The teeth of the cutter employed in this type of operation are normally substantially involute teeth having serrations formed extending up and down the faces of the teeth. These serrations provide intermediate lands having sharp corners or cutting edges at their upper portions in the surface of the tool teeth and are of a depth to permit several regrinds. In order to preserve free cutting action, it is customary to resharpen teeth of this type by grinding the surfaces of the teeth. This grinding operation reduces the thickness of the teeth relative to the base circle and is performed in a manner so that each surface of the tooth, both before and after regrinding, is substantially an involute generated from the same base circle.

It will be evident that after resharpening, it will be necessary to reduce the center distance between the tool and the gear with which it is meshed in order to provide the necessary type of mesh which insures the proper guiding action. It will also be readily evident that regrinding the surfaces of the teeth of the cutter without a further operation would thus increase the addendum of the cutter tooth by an amount depending on the reduction of center distances necessary to provide a tight mesh after regrinding.

It will also be readily evident that regrinding the surfaces of the teeth of the cutter without regrinding the outside diameter would result in an increased dimension from a fixed chordal thickness to the original outside diameter. The increase of this dimension would be very rapid on small pressure angles and slower on large pressure angles because of the varying angle of the wedge.

This dimension from a fixed chordal thickness to the reduced outside diameter is currently called the "addendum height." On a new cutter this dimension is measured from the nominal operating pitch diameter, as shown in Figure 4.

In the past it has been the practice, after regrinding the faces of the cutter teeth, to maintain an outside diameter of the cutter teeth to give an "addendum height" equal with the original measurement of "addendum height" at the original tooth thickness throughout the useful life of the tool.

I have found that substantially improved results are obtained when, during the resharpening operation on the profiles of the tooth, the outside diameter of the cutter is reduced less than in the above practice so as to give an increased "addendum height" with each regrind. Thus, after each succeeding regrind, the "addendum height" of the cutter tooth at the specified tooth thickness is increased.

I have found that substantially improved results are obtained when during the resharpening operation the outside diameter of the cutter is reduced somewhat less than in the above practice so that after each succeeding regrinding the measured "addendum height" of the cutter tooth is increased over prior practices.

It is accordingly an object of the present invention to resharpen cutter teeth by grinding their working profiles and to reduce the outside diameter by an amount which will result in an increased "addendum height."

It is a further object of the present invention to provide a resharpened gear cutting tool in the form of a gear characterized by having an "addendum height" which is greater than the "addendum height" of the tool in new condition.

Other objects of the invention will be apparent as the description proceeds, and when taken in conjunction with the accompanying drawing wherein.

Figure 1:
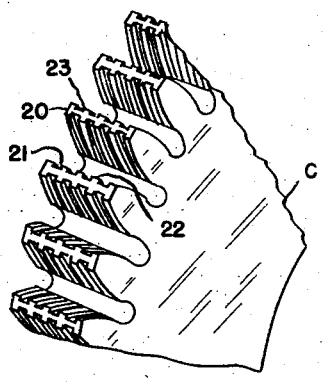
Figure 1 is a fragmentary perspective of a portion of a gear cutter of the type referred to herein.

In Figure 1 I have illustrated a cutter C having teeth 20 provided with serrations 21, leaving guiding lands 22 provided with sharp cutting edges or corners 23.

Figure 2:
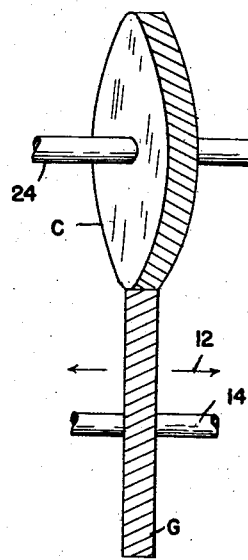
Figure 2 is a diagrammatic view showing the meshing relationship between cutters of the type referred to and the gear.

In Figure 2 I have illustrated the relationship between the cutter C and a gear G. During the finishing operation, it will be noted that the axis 24 of the cutter C is inclined with respect to the axis 14 of the gear G. In Figure 2 the axes 14 and 24 are both illustrated as in horizontal planes. As is now well understood in the art, the contact between the teeth of the gear G and cutter C at this crossed axes relationship covers a small area, and during rotation this area generates a relatively narrow band up and down the faces of the gear teeth. In order to distribute the cutting action uniformly across the faces of the gear teeth 10 a relative feeding motion is introduced, which may be in the direction of the arrow 12 in Figure 2.

Figure 3:
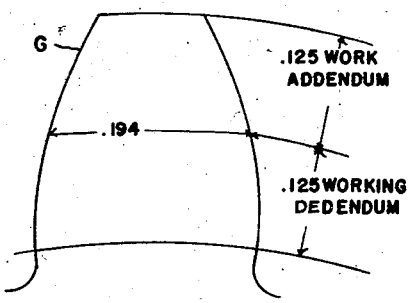
Figure 4:
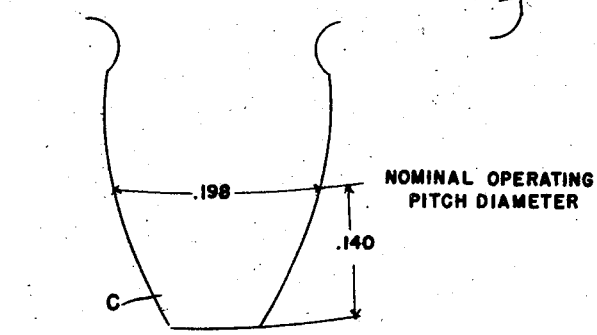

In Figures 3 and 4 I have illustrated the geometry involved. For purposes of illustration I refer to the design of a cutter for a standard 8 D. P., 20° P. A. helical gear. The standard addendum for this gear is .125 inch, and at that point a chordal tooth thickness exists of .196 inch. The working dedendum is .125 inch.

To finish the gear so as to have .002 inch backlash, or .004 backlash with an identical mating gear, the cutter as originally made would have the following characteristics. Instead of a chordal tooth thickness of .196 inch, the cutter tooth is made thicker by .002 inch to provide for the reduced thickness of the gear tooth. Thus the chordal tooth thickness of the cutter teeth is .198 inch, and in order to clean up the working dedendum of the gear, the cutter tooth is provided with an additional .015 addendum. The cutter teeth therefore have, at a tooth thickness of .198, an "addendum height" of .125+.015 or .140 inch.

This is illustrated in Figures 3 and 4, where in Figure 3 I show a dimensioned gear tooth G, and in Figure 4, a dimensioned cutter tooth C.

Figure 5:
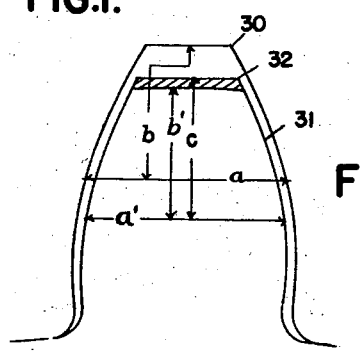
Figures 3 to 5 are diagrams illustrating the changes involved.

Referring now more particularly to Figure 5, I have shown in superposed relation teeth of a gear cutter, the tooth 30 indicating the tooth of an original cutter, the tooth 31 indicating a tooth of a reground cutter as made by prior practice, and the tooth 32 illustrating the resharpened tooth according to the present invention.

As briefly described above, the tooth of the new cutter has a chordal tooth thickness a, and an "addendum height" above this chordal thickness of b. When the cutter was reground according to prior practice, the outside diameter was reduced such that an "addendum height" of b' was produced, this "addendum height" b' being equal to the initial "addendum height" b.

My investigation has established that substantially improved results are obtained where, in regrinding the outside diameter, less stock is removed, so that the reground tooth has the dimensions shown at 32; that is, an "addendum height" of c above the point of tooth thickness a', where a' equals a.

The delicate nature of the guiding action between tool and gear is no doubt responsible, and balances are better preserved by the present practice. As one of the parts, either the gear or tool, is mounted for free rotation, the generated profile is improved.

In Figure 5 the shaded portion represents the portion of the tooth retained according to this invention. This portion was removed according to prior practice.

It may be mentioned at this time that the conditions just referred to are possible only with involute teeth. As is well understood, involute teeth of two mating gears are adapted to mesh at different center distances, giving rise to different operating pressure angles and different pitch circles.

It has been found that, according to the old practice illustrated, there was considerable uncertainty in the reproduction of the desired curves from the cutter.

It has also been found that with the revised new practice with increased "addendum height," as illustrated by the shaded portions in Figure 5, the cutters reproduce the desired shape with more uniformity, largely due to maintaining balanced condition of cutting which occurred in the original cutter shape.

It will be appreciated of course that it is difficult to set numerical values for this increase in the addendum which will cover all cases. I have therefore chosen to set forth the information which will enable those skilled in the art to practice the invention by describing a particular example. On cutters of approximately 7 to 9 pitch, the practice is to increase the initial "addendum height" by an increment of from two to ten thousandths of an inch (.002–.010), and preferably about five thousandths (.005) when removing about four thousandths (.004) in chordal thickness.

It is to be recognized that this increase in the "addendum height" with successive regrinds changes materially, increasing the additional "addendum height" more rapidly with each regrind.

This function of the cutters is a very valuable addition to the art and has particular reference to the shaving of gears at limited crossed axes and has a definite reference to the limited use provided by the relatively shallow serrations which normally provide for five or six regrinds.

Increasing the "addendum height" with successive regrinds causes the cutting action on the opposite sides of the cutter teeth to be more balanced than in the previous practice.

In a previous application I have illustrated the results of an unbalanced cutting condition which produced hollow profiles at or near the pitch line of the work tooth, produced by a cutter of perfect involute shape which did not give a balanced cutting condition.

This present increase of the addendum greatly improves the operating contact between the cutter and gear teeth, and as a result the uniformity of involute curvature obtained on the surface of the gear teeth is substantially increased. It is found that by adopting the present practice, an involute curve on the cutter tooth produces involute curves throughout the useful life of the tool without any modification of cutter tooth profile.

While I have illustrated and described a single specific embodiment of my invention, it will be apparent to those skilled in the art that various additions, modifications, omissions, combinations and substitutions may be made which will be within the spirit and scope of my invention as defined by the appended claims.

What I claim as my invention is:

1. The method of finishing a series of identical gears with a gear-like cutter having teeth provided with grooves forming cutting edges in the faces thereof; said tool, in new condition, being shaped to form a desired profile on the teeth of said gears, which comprises: running said tool in mesh at limited crossed axes sequentially with a number of said gears while relatively translating said tool and gears until said cutting edges become dulled, regrinding the faces of said tool teeth to resharpen said cutting edges, thereby reducing the chordal thickness of said tool teeth by about .004 inch, reducing the outside diameter of said tool by an amount which provides an increased "addendum height" equivalent to an increase in "addendum height" of between .002 and .010 inch for a 7-9 pitch cutter, and continuing the finishing of gears of said series of identical gears with periodical resharpenings accompanied by provision of like increases in "addendum height" until said tool is expended by reason of insufficient remaining depth of grooves and with a decreased distance between centers of the tool and the gears after each resharpening to provide for reduction of the chordal thickness.

2. The method of finishing a series of identical gears with a gear-like cutter having teeth provided with grooves forming cutting edges in the faces thereof; said tool, in new condition, being shaped to form a desired profile on the teeth of said gears, which comprises: running said tool in mesh at limited crossed axes sequentially with a number of said gears while relatively translating said tool and gears until said cutting edges become dulled, regrinding the faces of said tool teeth to resharpen said cutting edges, thereby reducing the chordal thickness of said tool teeth by about .004 inch, reducing the outside diameter of said tool by an amount which provides an increased "addendum height" equivalent to an increase in "addendum height" of about .005 inch for a 7-9 pitch cutter, and continuing the finishing of gears of said series of identical gears with periodical resharpenings accompanied by provision of like increases in "addendum height" until said tool is expended by reason of insufficient remaining depth of grooves and with a decreased distance between centers of the tool and the gears after each resharpening to provide for reduction of the chordal thickness.

ROBT. S. DRUMMOND.